United States Patent
Manczak et al.

(10) Patent No.: US 8,453,151 B2
(45) Date of Patent: May 28, 2013

(54) METHOD AND SYSTEM FOR COORDINATING HYPERVISOR SCHEDULING

(75) Inventors: Olaf Manczak, Hayward, CA (US); Christopher A. Vick, San Jose, CA (US); Michael H. Paleczny, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 0 days.

(21) Appl. No.: 13/345,490

(22) Filed: Jan. 6, 2012

(65) Prior Publication Data
US 2012/0180050 A1   Jul. 12, 2012

Related U.S. Application Data

(63) Continuation of application No. 11/932,844, filed on Oct. 31, 2007, now Pat. No. 8,132,173.

(60) Provisional application No. 60/976,373, filed on Sep. 28, 2007.

(51) Int. Cl.
*G06F 9/46* (2006.01)
*G06F 3/00* (2006.01)

(52) U.S. Cl.
USPC .............................. 718/102; 710/7

(58) Field of Classification Search
None
See application file for complete search history.

(56) References Cited

U.S. PATENT DOCUMENTS

| 7,260,663 | B2 * | 8/2007 | Gregg et al. | 710/260 |
| 7,810,093 | B2 * | 10/2010 | Jones et al. | 718/102 |
| 2007/0192518 | A1 * | 8/2007 | Rupanagunta et al. | 710/62 |

OTHER PUBLICATIONS

IBM Systems Virtualization, Version 2, Release 1; IBM Corporation 2005; http://pubib.boulder.ibm.com/infocenter/eserver/v1r2/topic/eicay/eicay.pdf; 16 pages.

* cited by examiner

*Primary Examiner* — Meng An
*Assistant Examiner* — Wissam Rashid
(74) *Attorney, Agent, or Firm* — Osha Liang LLP

(57) ABSTRACT

A method for executing an application on multiple nodes includes synchronizing a first clock of a first node and a second clock of a second node, configuring a first hypervisor on the first node to execute a first application domain and a first privileged domain, and configuring a second hypervisor on the second node to execute a second application domain and a second privileged domain. Configuring the hypervisor includes allocating a first number of cycles of the first clock to the first privileged domain. Configuring the second hypervisor includes allocating the first number of cycles of the first clock to the second privileged domain. The method further includes executing the application in the first application domain and the second application domain. The first application domain and the second application domain execute semi-synchronously and the first privileged domain and the second privileged domain execute semi-synchronously.

15 Claims, 6 Drawing Sheets

METHOD AND SYSTEM FOR COORDINATING HYPERVISOR SCHEDULING

CROSS-REFERENCE TO RELATED APPLICATIONS

The present application is a continuation application of and, thereby, claims priority under 35 U.S.C. §120 to U.S. application Ser. No. 11/932,844, entitled, "METHOD AND SYSTEM FOR COORDINATING HYPERVISOR SCHEDULING," and incorporated herein by reference. Further, U.S. application Ser. No. 11/932,844 claims benefit of U.S. Provisional Application Ser. No. 60/976,373 entitled "METHOD AND SYSTEM FOR COORDINATING HYPERVISOR SCHEDULING," filed on Sep. 28, 2007 in the name of Olaf Manczak, Christopher A. Vick, and Michael H. Paleczny.

BACKGROUND

A typical distributed computer system includes multiple interconnected nodes. Each node in the distributed computer system may include a separate processor. Accordingly, applications which execute in parallel on the distributed computer system are able to exploit the processing power provided by interconnection of the processors. For example, by combining the processing power provided by the multiple interconnected nodes, a given computation may be executed faster by partitioning the computation into multiple sections and executing each section in parallel on several nodes rather than executing the application serially on a single node.

Applications executing on several nodes may have synchronization barriers. A synchronization barrier synchronizes nodes by halting execution on the nodes that have reached a specified instruction until the remaining nodes have reached the specified instruction. For example, consider the scenario in which a dataset is divided into ten sections and each section is executed by a different node. Further, every fifty steps, each node communicates the results of the execution with the other nodes. Communicating the results may be performed using a send instruction and a corresponding receive instruction. The execution results are then used during the next fifty steps. When a node completes the execution of the fifty steps, the node executes the send instruction to send the result that the node calculates. The node further executes a receive instruction to receive the results from another node. The instruction to receive the execution results from other nodes forms a synchronization barrier. Thus, the execution of the application by the nodes is synchronized at the receive instruction.

Several reasons may exist for nodes to wait extended periods of time before the remaining nodes reach the synchronization barrier. One reason is because the execution of the application is often not the only operation being performed by the node. For example, an operating system on the node may perform management tasks for the node, such as input and output of data, scheduled maintenance tasks, etc. In such scenario, all the nodes in the distributed computer system are often forced to wait until the operating system completes the management tasks or until control is switched back to the application.

The delay may be increased when the same management task is performed by different nodes at different synchronization barriers. As an example, consider the scenario in which there are one thousand nodes, and each node has a one percent chance of performing a management task between any two synchronization barriers in the execution of the application. Thus, an average of ten of the nodes will perform a management task between each two synchronization barriers. Because all nodes must enter the barrier before any nodes leave the barrier, the nodes not performing the management task must wait for the ten nodes to complete the management task at each synchronization barrier. Therefore, the total delay due to the management task is increased. Specifically, rather than the delay being the sum of the amount of time to perform the management task on each node, the delay is the amount of time needed to perform the management task between each pair of barriers multiplied by the number of synchronization barriers.

SUMMARY

In general, in one aspect, the invention relates to a method for executing an application on a plurality of nodes, that includes synchronizing a first clock of a first node of the plurality of nodes and a second clock of a second node of the plurality of nodes, configuring a first hypervisor on the first node to execute a first application domain and a first privileged domain, wherein configuring the hypervisor comprises allocating a first number of cycles of the first clock to the first privileged domain, configuring a second hypervisor on the second node to execute a second application domain and a second privileged domain, wherein configuring the second hypervisor that includes allocating the first number of cycles of the first clock to the second privileged domain, and executing the application in the first application domain and the second application domain, wherein the first application domain and the second application domain execute semi-synchronously and the first privileged domain and the second privileged domain execute semi-synchronously.

In general, in one aspect, the invention relates to a system for executing an application, that includes a plurality of nodes, and instructions stored on each node of the plurality of nodes to configure a hypervisor on the node to execute an application domain and a privileged domain, wherein configuring the hypervisor comprises allocating a first number of cycles of a clock on the node to the privileged domain, synchronize the clock on the node with clocks on other nodes of the plurality of nodes, and execute the application in the application domain, wherein the first number of cycles are the same for each hypervisor, and wherein the application domains on each node of the plurality nodes execute semi-synchronously and the privileged domains on each node of the plurality of nodes execute semi-synchronously.

In general, in one aspect, the invention relates to a computer readable medium that includes computer readable program code for executing an application on a plurality of nodes embodied therein for causing a computer system to synchronize a first clock of a first node of the plurality of nodes and a second clock of a second node of the plurality of nodes, configure a first hypervisor on the first node to execute a first application domain and a first privileged domain, wherein configuring the hypervisor comprises allocating a first number of cycles of the first clock to the first privileged domain, configure a second hypervisor on the second node to execute a second application domain and a second privileged domain, wherein configuring the second hypervisor that includes allocating the first number of cycles of the first clock to the second privileged domain, and execute the application in the first application domain and the second application domain, wherein the first application domain and the second application domain execute semi-synchronously and the first privileged domain and the second privileged domain execute semi-synchronously.

Other aspects of the invention will be apparent from the following description and the appended claims.

DETAILED DESCRIPTION

Figure 1:
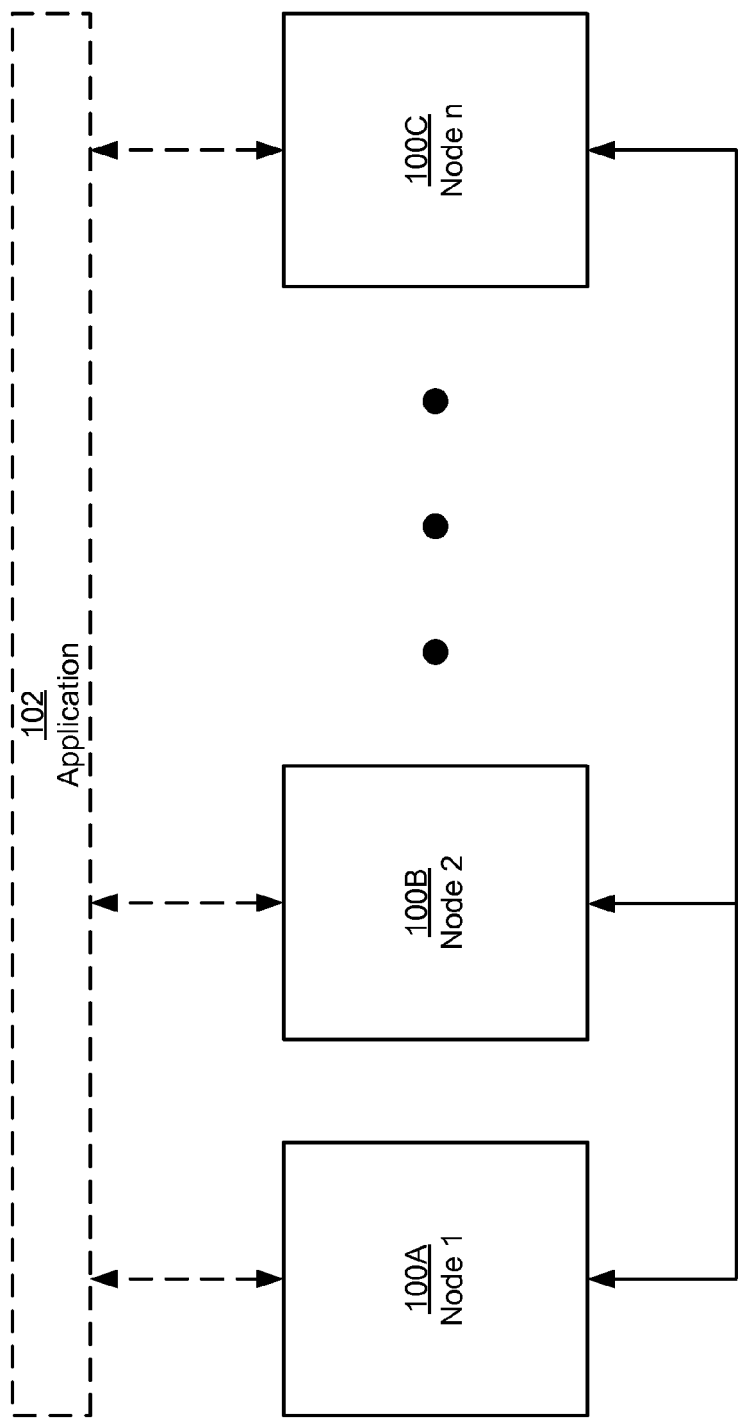
FIGS. 1 and 2 show schematic diagrams of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for executing an application on multiple nodes. Specifically, embodiments of the invention execute the application in a hypervisor environment. In the hypervisor environment, the application executes in an application domain (described below) and the management tasks, such as polling, I/O, etc. are performed in a privileged domain (described below). A hypervisor (described below) controls which domain (i.e., application domain or privileged domain) is executing at a given point in time. The control is facilitated by the using the hardware clock. Accordingly, embodiments of the invention synchronize the hardware clocks and configure the hypervisors to switch between domains uniformly in terms of the number of cycles of the hardware clock that each domain executes.

By configuring the hypervisors to switch between domains according to a number of clock cycles assigned to the domains, embodiments of the invention execute the application on the different nodes semi-synchronously. Semi-synchronous execution allows for a potential margin of error related to inability to perfectly synchronize the clocks and non-uniform clock rates across the nodes. For example, the execution of the application across different nodes may overlap by at least ninety percent resulting in a potential margin of error of approximately ten percent. In one or more embodiments of the invention, the margin of error may be greater than an operating system directly performing synchronization. Further, one or more embodiments of the invention do not require hardware modifications to perform the semi-synchronous execution of the application.

Figure 2:
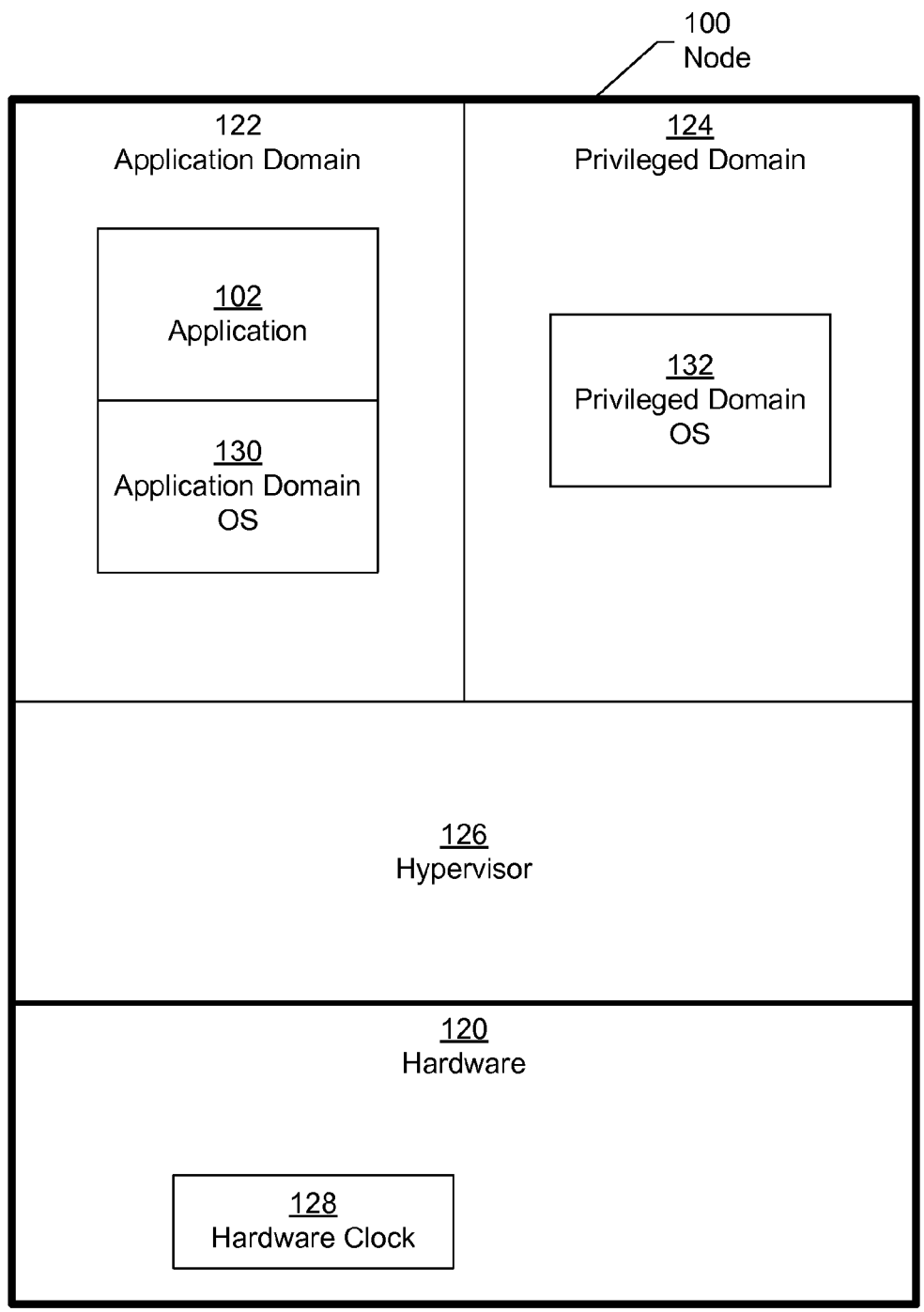

FIGS. 1 and 2 show schematic diagrams of a system in accordance with one or more embodiments of the invention. FIG. 1 shows a schematic diagram of a distributed computer system in accordance with one embodiment of the invention. The distributed computer system may be virtually any type of interconnection of nodes (e.g., nodes 1 (100A), node 2 (100B), node n (100C)) in virtually any topology. For example, the nodes (e.g., nodes 1 (100A), node 2 (100B), node n (100C)) may be arranged in a star topology, a ring topology, a tree topology, and/or any other topology to allow for communication among nodes. Further, each node may have a single processor or have multiple processing units such as a multi-core processor that includes multiple micro-cores or multiple processors. Alternatively, the distributed computer system may correspond to multiple processors with shared memory system (i.e., each node is a processor), several interconnected servers, or a group of computers connected over the Internet. Further, the distributed computer system may also include one or more subsystems (not shown), in which the subsystem is of a different type and topology than the parent system (i.e., the distributed system itself may be composed to an aggregation of other distributed systems).

Each node (e.g., nodes 1 (100A), node 2 (100B), node n (100C)) in the distributed computer system may be virtually any type of computing system, such as a server (i.e., web server, database server, etc.), personal computer, laptop computer, etc. Further, the nodes (e.g., nodes 1 (100A), node 2 (100B), node n (100C)) of the distributed computer system may be of heterogeneous types or of a homogeneous types.

Each node (e.g., nodes 1 (100A), node 2 (100B), node n (100C)) in the distributed computer system includes functionality to execute an application (102). Specifically, each node (e.g., nodes 1 (100A), node 2 (100B), node n (100C)) includes functionality to execute instructions of the application (102). For example, each node may execute the application (102) on a portion of a dataset. The portions may be defined and assigned to the nodes (e.g., nodes 1 (100A), node 2 (100B), node n (100C)) so as to distribute the number of compute cycles required to execute each portion.

FIG. 2 shows a schematic diagram of a node (100) in accordance with one or more embodiments of the invention. As shown in FIG. 2, a node (100) includes hardware (120), an application domain (122), a privileged domain (124), and a hypervisor (126) in accordance with one or more embodiments of the invention.

The hardware (120) includes the physical devices on a node (100). For example, the hardware may include one or more processors (not shown), memory (not shown), peripheral devices (e.g., storage drives, monitors, etc.), and a hardware clock (128). In one or more embodiments of the invention, a hardware clock (128) is a timing device used to track time incrementally. The hardware clock (128) may continuously running even when the machine is powered off. Further, the hardware clock (128) may be set to count in second, millisecond, microsecond, etc. increments. In one or more embodiments of the invention, the hardware clocks (128) on the various nodes execute at approximately the same speed.

Additionally, in one or more embodiments of the invention, the hardware clock is programmable to generate an interrupt at a specified time. An interrupt stops the processor or micro-core from executing the current process. In response to the interrupt, the processor or micro-core identifies a trap handler. A trap handler is one or more instructions which are executed by the processor when an interrupt occurs. Specifically, a trap handler defines the operations to perform when an interrupt occurs. In one or more embodiments of the invention, the trap handler switches control to the hypervisor or is a part of the hypervisor.

In one or more embodiments of the invention, software executes on the hardware (120) of the node (100). The software includes an application domain (122), a privileged domain (124), and a hypervisor (126). An application domain (122) and a privileged domain (124) are partitions of the resources available on the node (100). The partitioning of resources may be in terms of space (e.g., memory), time and space (e.g., processor or micro-core of a processor), or time.

A domain is a type of virtual machine within which a program may execute. Specifically, domains provide a method for containment of software and a separation of software from hardware. For example, domains may be used to prevent software failures in a single domain from causing another failure in the system. Each domain may be allocated disjoint or non-overlapping physical memory.

An application domain (122) is a type of domain with access limited to virtual resources. A virtual resource is a layer of indirection to represent the physical resources, such as the hardware, of the node. Specifically, in one or more embodiments of the invention, programs in the application domain (122) perform functions that are wholly contained in the application domain (122). For example, programs in the application domain (122) may be unable to directly control hardware (120), access memory of other domains (100), or manage the execution of all applications, including on other domains of the node (100). The application domain (122) includes an application domain operating system (130) and the application (102) (described above and in FIG. 1).

The application domain operating system (130) includes functionality to manage the execution of processes in the application domain (122). In one or more embodiments of the invention, the application domain operating system (130) operates as if it has sole control of the hardware (120). Specifically, the application domain operating system (130) operates as if the application domain operating system (130) is the only operating system on the node (100) and the resources (e.g., processor cycles, memory) allocated to the application domain (122) are the only resources available on the node (100). Thus, the application domain operating system (130) includes functionality to control the operating environment of the application (102).

In one or more embodiments of the invention, the application domain operating system (130) on each node in the distributed computer system is configured to allocate resources, such as memory, to the application allowing for synchronous execution of applications. For example, the application domain operating system (130) may be identical across all nodes or configured to allocate resources identically across all nodes. In one or more embodiments of the invention, the application domain operating system (130) is configured to not perform unnecessary management tasks. For example, the application domain operating system (130) may be configured to offload computational work related to handling input and output to the privileged domain (124) (described below).

In addition to an application domain (122), the node (100) also includes a privileged domain (124). In one or more embodiments of the invention, the privileged domain (124) has a separate address space and operating system environment than the application domain (122). The privileged domain (124) includes a privileged domain operating system (132). The privileged domain operating system (132) includes functionality to execute software to perform tasks on behalf of the node (100) and the application domain (122). For example, the privileged domain software may include functionality to configure the hypervisor (126), perform communications with a physical device (120) for other domains (e.g., application domain (122)), create, destroy, and configure guest and driver domains, and functionality to perform the management of the node (100). Further, in one or more embodiments of the invention, the privileged domain operating system (132) or other software that executes in the privileged domain includes functionality to synchronize the hardware clock (128) with hardware clocks on other nodes in a distributed computer system. For example, software in the privileged domain (124) may include functionality to use a network time synchronization protocol to request synchronization of the clocks of multiple nodes. In one or more embodiments of the invention, the node (100) may also include a driver domain or a guest domain. Rather than or in addition to the privileged domain performing I/O and management tasks, the driver domain or guest domain may perform the I/O and management tasks for the application domain (122). Further, the privileged domain (124) may be a control domain or driver domain.

A hypervisor (126) includes functionality to control the sharing of hardware resources on the node (100). Specifically, the hypervisor (126) includes functionality to virtualize the physical devices of the node so that more than one operating system may share the same physical device transparently. Further, the hypervisor (126) controls when the application domain (122) and the privileged domain (124) are allowed to execute. For example, the hypervisor (126) may be a thin privileged layer of software that only manages the switch between the application domain (122) and the privileged domain (124).

While FIG. 2 shows one or more embodiments of the invention in which the hypervisor (126) executes directly on the hardware, the hypervisor (126) may alternatively execute on a host operating system without departing from the scope of the invention. In one or more embodiments of the invention, the host operating system may exist in a layer between the hypervisor (126) and the hardware (120). For example, the host operating system may be used to support more types of hardware. Further, while FIG. 2 shows a privileged domain (124) as a separate domain, the privileged domain may be a part of the hypervisor (126) or a part of the host operating system. Further, the privileged domain (124) may be multiple domains. For example, the privileged domain (124) may include a separate domain for each physical device driver to handle physical I/O, a separate domain to control the hypervisor, etc.

Figure 3:
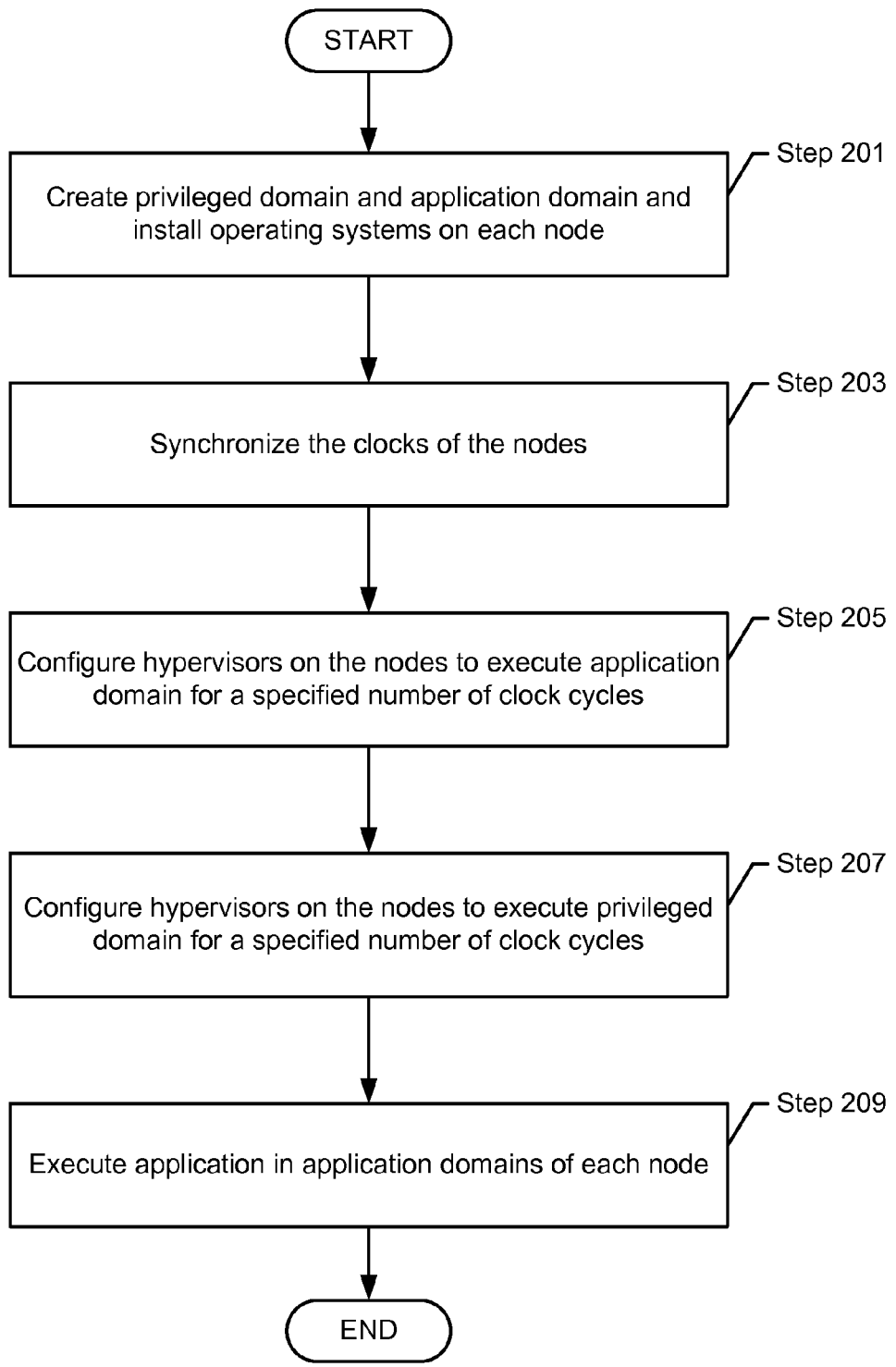
FIGS. 3 and 4 show flowcharts of a method in accordance with one or more embodiments of the invention.
Figure 4:
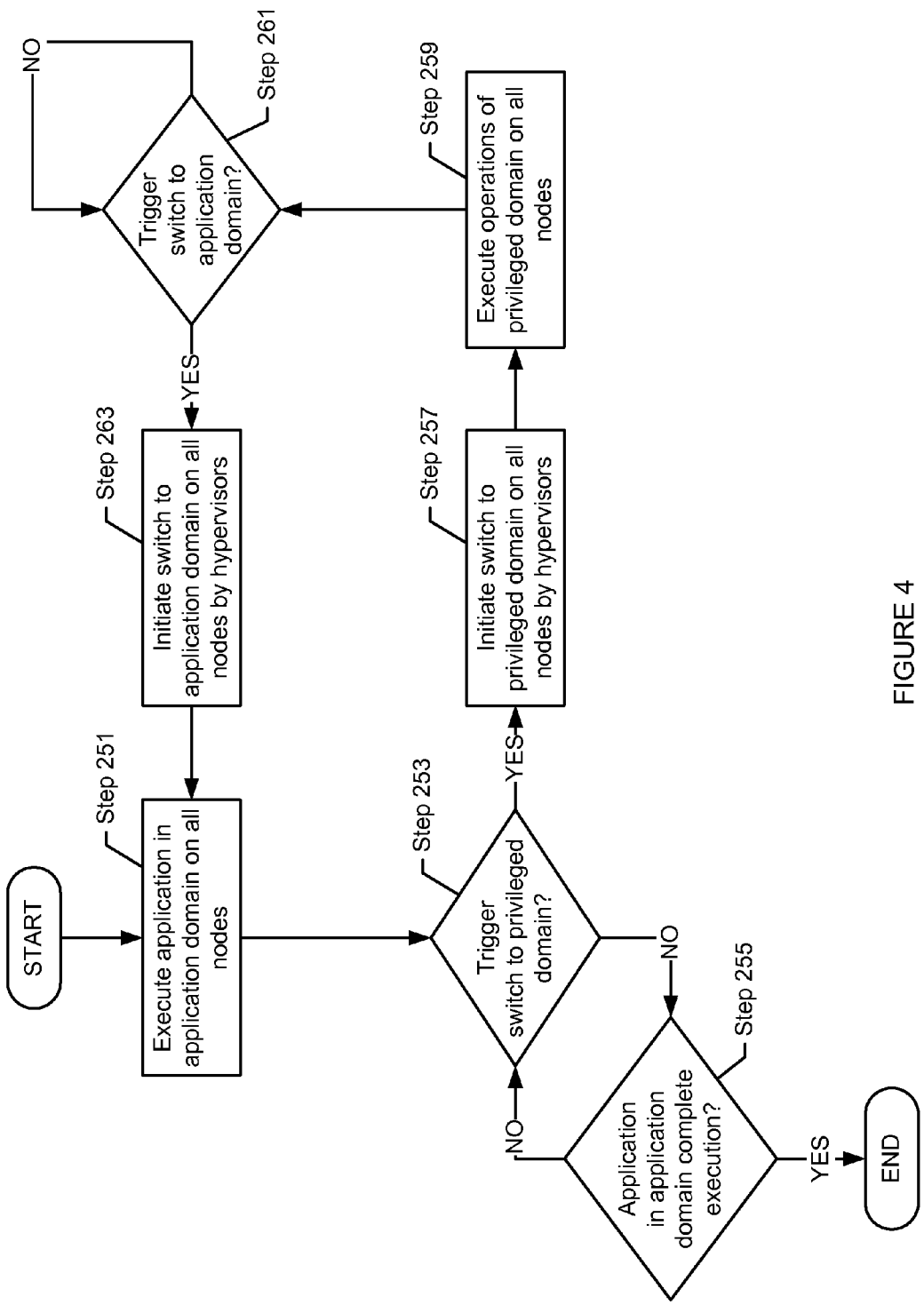

FIGS. 3 and 4 show flowcharts of a method in accordance with one or more embodiments of the invention. While the various steps in these flowcharts are presented and described sequentially, one of ordinary skill will appreciate that some or all of the steps may be executed in different orders and some or all of the steps may be executed in parallel.

FIG. 3 shows a flowchart of a method for configuring a system for execution of the application in accordance with one or more embodiments of the invention. Initially, the privileged and the application domains are created and the operating systems installed on each node (Step 201). Techniques known in the art may be used to create the privileged domain and the application domain in accordance with one or more embodiments of the invention. Once the privileged domain is created and the operating system is installed on the privileged domain, the privileged domain may be used to create the application domain. For example, an administrator or program may use the privileged domain to request the creation of the application domain and to install the software on the application domain.

Further, the clocks of the nodes are synchronized in accordance with one or more embodiments of the invention (Step 203). Synchronizing the clocks may be performed using any suitable time synchronization tool that is capable of synchronizing clocks with a sufficient precision. In one or more embodiments of the invention, a sufficient precision is within a fraction of a scheduling cycle. For example, one way to synchronize the clocks is to use the network time synchronization protocol or the simple network time synchronization protocol. The network time synchronization protocol and simple network time synchronization protocol may be used, for example, as described in RFC 1305 and RFC 2030, respectively. Other protocols and synchronization tools to synchronize clocks may be used without departing from the scope of the invention.

The hypervisors on the nodes are also configured to execute the application domain for a specified number of clock cycles each time the application domain is allowed to execute (Step 205). Similarly, the hypervisors on the nodes are also configured to execute the privileged domain for a specified number of clock cycles each time the privileged domain is allowed to execute (Step 207). Specifically, a specified number of cycles are allocated to the privileged domain. Thus, each node is configured to execute its application domain for the same number of cycles as every other node and to execute its privileged domain for the same number of cycles as every other node. Thus, for example, all nodes may have the hypervisor configured to execute the application domain for twelve cycles of the hardware clock each time the application domain is allowed to execute and the privileged domain for three cycles of the hardware clock each time the privileged domain is allowed to execute.

In one or more embodiments of the invention, an administrator using a program (or as a standalone program) in the privileged domain may configure the hypervisors. Specifically, the administrator (or standalone program) may set the number of cycles for the application domain and the number of cycles for the privileged domain by accessing configuration variables of the hypervisors. Alternatively, the administrator (or standalone program) may set a ratio of the number of cycles allocated to each domain. For example, the administrator (or standalone program) may configure the hypervisors to switch between the application domain and the privileged domain at the same number of cycles, such that each of the domains receives an equal share of the processor clock cycles. In one or more embodiments of the invention, the administrator (or standalone program) may configure one hypervisor on one node and then propagate the configuration to the remaining nodes of the distributed computer system.

Once the hypervisors are configured, the application is executed in the application domains of each node (Step 209). At this stage, the hypervisors on all of the nodes switch control to the application domain. When the application domain is executing, the application domain operating system only executes the application. Specifically, the application domain operating system only performs tasks required for the execution of the application in accordance with one or more embodiments of the invention.

Asynchronous tasks may be performed for the application domain by the privileged domain. Specifically, during execution of the application in the application domain, the application may request to perform I/O operations with a hardware device. In one or more embodiments of the invention, the hardware requests are performed using a virtual device driver in the application domain operating system. To the application domain operating system, the virtual device driver may appear as a physical device driver for the hardware device. However, in one or more embodiments of the invention, the virtual device driver sends a request to the hypervisor. The hypervisor may forward the request to the privileged domain. Specifically, the hypervisor may copy the request from the memory allocated to the application domain to memory allocated to the privileged domain. When the privileged domain executes, the privileged domain may use a physical device driver to request the operation from the device. The results of the request may be similarly propagated back to the application domain.

FIG. 4 shows a flowchart of a method for execution of the application domain and the privileged domain by the hypervisor in accordance with one or more embodiments of the invention. In one or more embodiments of the invention, the hypervisor is able to control when the application domain and the privileged domain are executing by using the hardware clock. Specifically, the hypervisor may program the hardware clock to interrupt execution of a domain. The interrupt is used by the processor to find the appropriate trap handler corresponding to the interrupt. In one or more embodiments of the invention, the processor finds the trap handler using a table that specifies a trap handler for each type of interrupt. After identifying the trap handler for the interrupt, the processor executes the trap handler. The trap handler may be part of the hypervisor. Thus, a result of the hypervisor programming the hardware clock is the execution of instructions of the hypervisor at a scheduled time. The hypervisor may program the hardware clock once during the execution of the application or at each switch between the application domain and the control domain. Thus, for example, each hypervisor on a node may request that the interrupt is generated after a specific time period (e.g., the number of clock cycles, as configured above).

Initially, the application in the application domain on all nodes is executed (Step 251). Specifically, the application domain on each node is allowed to execute using the hardware of the node. While an application domain is executing, a determination may be made whether to switch to the privileged domain, thereby ending an execution cycle of the application domain (Step 253). In one or more embodiments of the invention, the hardware clock may generate the interrupt to initiate the switch. Further, a determination may be made whether the application has completed execution (Step 255).

If a determination is made to switch to the privileged domain, the switch to the privileged domain is initiated on all nodes by the hypervisors (Step 257). As discussed above, one way to initiate the switch may be performed is by generating the interrupt to start execution of instructions of the hypervisor. In response to the interrupt, the hypervisor switches control to the privileged domain. Further, the hypervisor may program the hardware clock to trigger an interrupt after the specified number of clock cycles allotted to the privileged domain.

Next, the operations of the privileged domain are executed on all nodes (Step 259). The operations of the privileged domain may include performing asynchronous operations on behalf of the application domain. For example, the privileged domain operating system may receive a system call via the hypervisor to perform an asynchronous operation. In response, the privileged domain operating system may perform the asynchronous operation and return results to the application domain through the hypervisor.

Further, the privileged domain may also ensure that the execution of the nodes remains synchronized. Several methods may be used to ensure the execution remains synchronized. In some embodiments of the invention, during execution of the privileged domain, processes in the privileged domains of the nodes may identify the value of the hardware clock and communicate to determine whether the hardware clocks on the nodes are remaining synchronized. If the hardware clocks are not remaining synchronized, the processes may resynchronize the hardware clocks by using the synchronization tools described above. In some embodiments of the invention, software on the privileged domain may periodically (e.g., every few seconds, minutes, half-hour, etc.) perform the synchronization step described above to ensure that the times on the hardware clocks remain within a threshold margin of error.

In some embodiments of the invention, the hypervisor may be configured to detect when the application domain is not performing any operations on the processor. For example, the application may be waiting at a synchronization barrier during the entire number of clock cycles dedicated to the application. In the example, the application that is waiting may have executed for more execution cycles than another application in a different application domain. Thus, the waiting of the application domain at the synchronization barrier may show that the hardware clocks need to be resynchronized. When the hypervisor detects that the application domain is not using allocated clock cycles, the hypervisor may request that the privileged domain resynchronize the hardware clocks.

Continuing with FIG. 4, in the process of executing the operations of the privileged domain, a determination is made whether to trigger the switch to the application domain (Step 261). For example, as discussed above, the hardware clock may trigger an interrupt. In response, a trap handler is executed which causes execution of the hypervisor. In addition, if all processes executing in the privileged domain are waiting and not actively executing, the privileged domain may transfer control back to the hypervisor. In one or more embodiments of the invention, if the privileged domain prematurely transfers control to the hypervisor, the premature transfer is performed semi-synchronously on all nodes. Further, in one or more embodiments of the invention, if the privileged domain prematurely transfers control to the hypervisor, the application domain is allocated the clock not used by the privileged domain in addition to the clock cycles allocated to the application domain.

When a few of the privileged domains transfer control to the hypervisor, the nodes may be temporarily not synchronized. However, the lack of synchronization may be corrected at the next synchronization barrier in the application. Specifically, at the next synchronization barrier in the application, the application domains on all of the nodes wait until the nodes with privileged domains that did not transfer control reach the synchronization barrier. Thus, even though the execution of the privileged domains may not be continuously synchronized, the privileged domains may execute semi-synchronously because of the synchronization barriers. If a determination is made not to switch to the application domain, then the operations of the privileged domain continue to execute.

When a determination is made to switch to the application domain, the switch to the application domain is initiated on all nodes by the hypervisor (Step 263). Switching control to the application domain may be performed in a manner similar to switching control to the privileged domain.

As shown in FIG. 4, the hypervisors switch between the application domain and the privileged domain according to the specified number of clock cycles allotted to each domain. Because the specified number is the same on each node, the hypervisors switch after the same number of clock cycles on each node.

In one or more embodiments of the invention, the hardware clocks on the node may be only semi-synchronous. Therefore, the execution of the application domains and the privileged domains may be semi-synchronous. An execution may be considered semi-synchronous when the execution of a domain overlaps on all nodes by at least ninety percent. For example, an execution cycle may be considered the time from which a domain is given control of the processor(s) of a node to when the specified number of clock cycles for the domain has expired. In one or more embodiments of the invention, the execution is semi-synchronous when the execution cycles for a domain on all nodes occurs within ninety percent of the specified number of clock cycles.

Further, in one or more embodiments of the invention, the specified number of cycles may be adapted during execution. For example, the privileged domain may return control of the processor(s) to the hypervisor prior to the expiration of the number of clock cycles because the privileged domain does not have additional operations to perform. The hypervisor may maintain statistics of the number of times that the privileged domain switches and how many clock cycles the privileged domain uses. A scheduling program or human operator may access the statistics and adapt the number of clock cycles allocated to the privileged domain. The scheduling program or human operator may ensure that all of the nodes perform the same adaptation. For example, a scheduling program in the control domain of one node may communicate with scheduling programs on other nodes to ensure that each node adapts the number of clock cycles allocated to the privileged domain to the same new number of clock cycles.

Further, when a node has multiple processors and/or multiple cores of a single processor, the application domain may be divided into multiple portions. Each portion of the application domain may execute on a separate processor or micro-core of the node. The hypervisor may be configured to switch control of a subset of the processors or micro-cores between a portion of the application domain and the privileged domain. For example, one portion of the application domain may continuously execute and have sole control of one or more processors or micro-cores while a second portion of the application domain shares the clock cycles of another processor or micro-core with the privileged domain.

Figure 5:
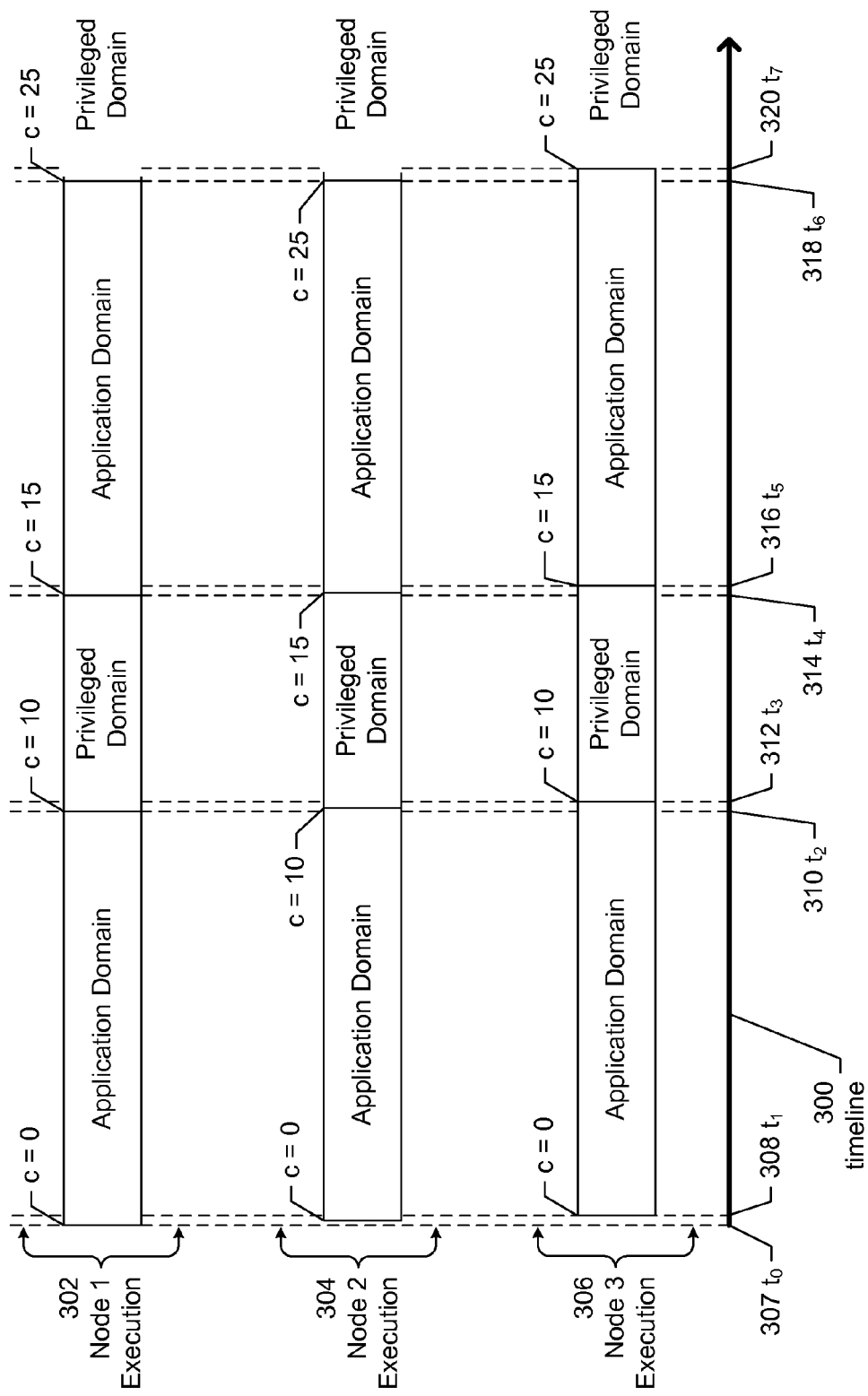
FIG. 5 shows an example in accordance with one or more embodiments of the invention.

FIG. 5 shows an example in accordance with one or more embodiments of the invention. For the example, consider the scenario in which three nodes (e.g., node 1, node 2, node 3) are executing an application. To execute the application, an application domain and a privileged domain are created on each node. A hypervisor on each node is configured to execute the application domain for ten clock cycles each time the application domain is executed and to execute the privileged domain for five clock cycles each time the privileged domain is executed. Further, the hardware clocks on each node are synchronized prior to initiating execution of the application in the application domains.

FIG. 5 further shows an example of the execution of the application on the three nodes, as measured according to a real-time timeline (300). The timeline (300) shows how the execution may be observed by an outside observer. Node 1 execution (302) shows when node 1 switches between domains as compared to the timeline (300). Similarly, node 2 execution (304) shows when node 2 switches between domains as compared to the timeline (300). Finally, node 3 execution (306) shows when node 3 switches between domains as compared to the timeline (300).

Continuing with FIG. 5, "c" denotes the value of the clock on the node. Specifically, "c" denotes the number of clock cycles that have passed since the start of the execution. The number of clock cycles by the node may be used to trigger the start and/or end of an execution cycle. An execution cycle for the domains starts when the control of the processor(s) is given to a domain and ends when the control is switched from the domain. Thus, in the example, the first execution cycle for the application domain is between when the value of the clock is zero to when the value of the clock is ten. The second execution cycle for the application domain is when the value of the clock is fifteen to when the value of the clock is twenty-five. Similarly, the first execution cycle for the privileged domain starts when the value of the clock is ten and ends when the value of the clock is fifteen.

The values, $t_0$ (307), $t_1$ (308), $t_2$ (310), $t_3$ (312), $t_4$ (314), $t_5$ (316), $t_6$ (318), and $t_7$ (320), on the timeline (300) show the real-time clock values as may be measured by an outsider. Initially, the clocks on the nodes are synchronized. However, in one or more embodiments of the invention, the synchronization may not be perfect. Specifically, at c=0 each application transfers control to the application domain. $T_0$ (307) shows when the first node (i.e., node 1) starts execution of the application domain. $T_1$ (308) shows when the last node (i.e., node 3) starts execution of the application domain. As shown by the difference between $t_0$ (307) and $t_1$ (308), even with synchronizing the clock, each node may start execution at approximately the same time. $T_2$ (310) shows when the first node (i.e., node 1) switches from the application domain to the privileged domain after the first execution cycle of the application domain. $T_3$ (312) shows when the last node (i.e., node 3) switches from the application domain to the privileged domain after the first execution cycle of the application domain. Similarly, $t_4$ (314) and $t_5$ (316) show when the first node and last node, respectively, switch from the privileged domain to the application domain after the first execution cycle of the privileged domain. Finally, $t_6$ (318) and $t_7$ (320) show when the first node and last node, respectively, switch from the application domain to the privileged domain after the second execution cycle of the privileged domain.

Thus, as shown in the example FIG. 5, the nodes (e.g., node 1, node 2, node 3) execute semi-synchronously. Specifically, as shown by the difference between $t_7$ (320) and $t_6$ (318), the difference between $t_5$ (316) and $t_4$ (314), the difference between $t_3$ (312) and $t_2$ (310), and the difference between $t_1$ (308) and $t_0$ (307) the value of the clock and the clock rate of the hardware clocks may be slightly unsynchronized. Nevertheless, at least ninety percent of the time, the execution of the application domain overlaps on the nodes during each execution cycle of the application domain.

Figure 6:
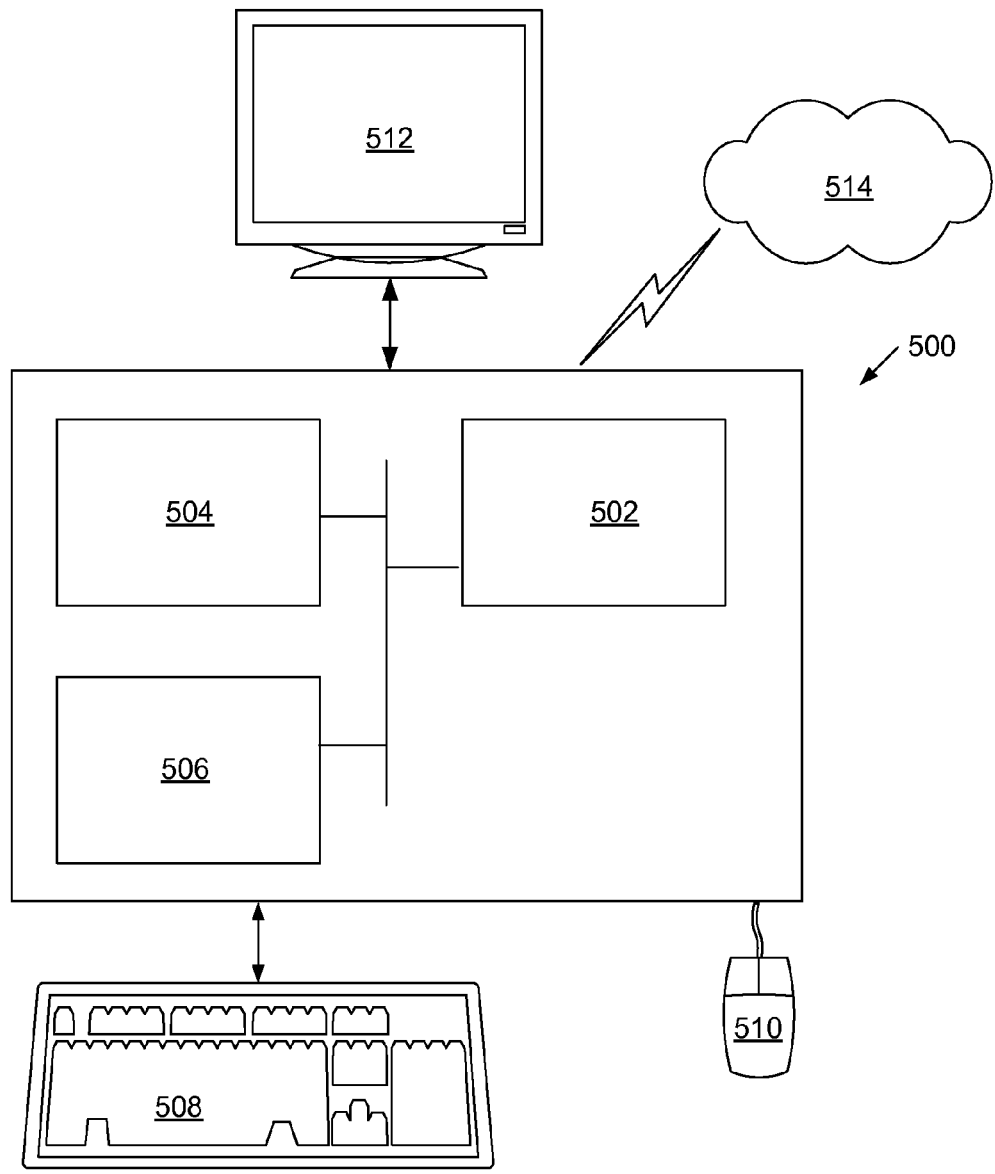
FIG. 6 shows a computer system in accordance with one or more embodiments of the invention.

Consequently, by performing the methods shown in FIGS. 4-6, acceptable synchronization is maintained by application with the need for special hardware or synchronization support. Further, the example shown and described in FIG. 5 provides a demonstration of this synchronization capability.

Embodiments of the invention provide a mechanism for synchronizing the execution of the application without modifications to the application or to the operating system. Specifically, by transferring asynchronous tasks of the application to a separate domain (i.e., the privileged domain), embodiments of the invention provide a mechanism whereby an application does not need to wait for the asynchronous tasks. Further, because the privileged domains execute semi-synchronously, the application domain may not need to wait until the execution of the management tasks. Specifically, the application domain may execute semi-synchronously. Further, embodiments of the invention may perform the synchronization without modification to available hardware. Additionally, in one or more embodiments of the invention, the method is portable across a variety of hardware and operating system platforms.

Embodiments of the invention may be implemented on virtually any type of computer regardless of the platform being used. For example, as shown in FIG. 6, a computer system (500) includes at least one processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (514) via a network interface connection (not shown). Those skilled in the art will appreciate that these input and output means may take other forms. Further, computer readable program code to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for executing an application on a plurality of nodes, comprising:

synchronizing a first clock of a first node of the plurality of nodes and a second clock of a second node of the plurality of nodes;

configuring a first hypervisor on the first node to execute a first application domain and a first privileged domain, wherein configuring the first hypervisor comprises allocating a first number of cycles of the first clock to the first privileged domain, wherein the first privileged domain comprises a first operating system, and wherein the first application domain comprises a second operating system;

configuring a second hypervisor on the second node to execute a second application domain and a second privileged domain, wherein configuring the second hypervisor comprising allocating the first number of cycles of the second clock to the second privileged domain, and wherein the first number of cycles of the second clock is a same number of cycles as the first number of cycles of the first clock; and executing the application in the first application domain and the second application domain, wherein executing the application in the first application domain comprises, for each asynchronous input and output (I/O) request from the application, issuing, by the second operating system, the asynchronous I/O request using a virtual device driver, wherein the virtual device driver sends the asynchronous I/O request to the first operating system in the first privileged domain via the first hypervisor, wherein the first application domain and the second application domain execute synchronously within a margin of error based on the same number of cycles being allocated to the first hypervisor and the second hypervisor, executing the first privileged domain and the second privileged domain, wherein executing the first privileged domain comprises, for each asynchronous I/O request from the application via the first hypervisor, issuing, by the first operating system in the privileged domain, the asynchronous I/O request using a physical device driver to obtain a result; and transmitting, by the first operating system in the privileged domain, the result to the first application domain via the first hypervisor, wherein the first privileged domain and the second privileged domain execute synchronously within the margin of error based on the same number of cycles being allocated to the first privileged domain and the second privileged domain.

2. The method of claim 1, further comprising:
changing the first number of cycles allocated to the first privileged domain and the second privileged domain to a second number of cycles allocated to the first privileged domain and the second privileged domain according to the execution of the first privileged domain and the second privileged domain.

3. The method of claim 1, wherein the first privileged domain and the second privileged domain are control domains.

4. The method of claim 1, wherein the margin of error is at most ten percent.

5. The method of claim 1, wherein a first portion of the first application domain executes continuously on a first subset of a first plurality of processing units of the first node, and
wherein a first portion of the second application domain executes continuously on a first subset of a second plurality of processing units of the second node, and
wherein a second portion of the first application domain shares a second subset of the first plurality of processing units with the first privileged domain, and
wherein a second portion of the second application domain shares a second subset of the second plurality of processing units with the second privileged domain.

6. The method of claim 5, wherein a processing unit of the first plurality of processing units is one selected from a group consisting of a processor and a micro-core.

7. A system for executing an application, comprising:
a plurality of nodes; and
instructions stored on each node of the plurality of nodes to:
configure a hypervisor on the node to execute an application domain and a privileged domain, wherein configuring the hypervisor comprises allocating a first number of cycles of a clock on the node to the privileged domain, wherein the privileged domain comprises a first operating system, and wherein the application domain comprises a second operating system;
synchronize the clock on the node with clocks on other nodes of the plurality of nodes; and
execute the application in the application domain, wherein executing the application in the application domain comprises, for each asynchronous input and output (I/O) request from the application:
issuing, by the second operating system, the asynchronous I/O request using a virtual device driver, wherein the virtual device driver sends the asynchronous I/O request to the first operating system in the privileged domain via the hypervisor, and
execute the privileged domain, wherein executing the privileged domain comprises, for each asynchronous I/O request from the application via the hypervisor,
issuing, by the first operating system in the privileged domain, the asynchronous I/O request using a physical device driver to obtain a result; and
transmitting, by the first operating system in the privileged domain, the result to the application domain via the hypervisor,
wherein the first number of cycles is the same for each hypervisor, and
wherein the application domains on each node of the plurality nodes execute synchronously within a margin of error and the privileged domains on each node of the plurality of nodes execute synchronously within the margin of error based on a same number of cycles being allocated to the privileged domain on each of the plurality of nodes.

8. The system of claim 7, wherein the instructions stored on each node further:
change the first number of cycles allocated to the privileged domain to a second number of cycles allocated to the privileged domain according to the execution of the privileged domain.

9. The system of claim 7, wherein the privileged domain is a control domain.

10. The system of claim 7, wherein the margin of error is at most ten percent.

11. The system of claim 7, wherein each node of the plurality of nodes comprises a plurality of processing units, and
wherein the instructions stored on each node of the plurality of nodes further:
continuously execute a first portion of the application domain of the node on a first subset of the plurality of processing units,
wherein a second portion of the application domain of the node shares a second subset of the plurality of processing units with the privileged domain.

12. The system of claim 11, wherein a processing unit of the plurality of processing units is one selected from a group consisting of a processor and a micro-core.

13. A non-transitory computer readable medium comprising computer readable program code embodied therein for executing an application on a plurality of nodes, the computer readable program code for causing a computer system to:
synchronize a first clock of a first node of the plurality of nodes with a second clock of a second node of the plurality of nodes;
configure a first hypervisor on the first node to execute a first application domain and a first privileged domain, wherein configuring the first hypervisor comprises allocating a first number of cycles of the first clock to the first privileged domain, wherein the first number of cycles of the first clock is a same number of cycles as allocated to a second privileged domain executing on a second node, wherein the second node comprises a second hypervisor configured to execute the second privileged domain and the second application domain, wherein the first privileged domain comprises a first operating system, and wherein the first application domain comprises a second operating system;
execute the application in the first application domain, wherein executing the application in the first application domain comprises, for each asynchronous input and output (I/O) request from the application,
issuing, by the second operating system, the asynchronous I/O request using a virtual device driver, wherein the virtual device driver sends the asynchronous I/O request to the first operating system in the first privileged domain via the first hypervisor,
executing the first privileged domain, wherein executing the first privileged domain comprises, for each asynchronous I/O request from the application via the first hypervisor,
issuing, by the first operating system in the privileged domain, the asynchronous I/O request using a physical device driver to obtain a result; and
transmitting, by the first operating system in the privileged domain, the result to the first application domain via the first hypervisor, and wherein the first application domain executes synchronously within a margin of error with the second application domain, and wherein the first privileged domain executes synchronously within the margin of error with the second privileged domain based on the same number of cycles being allocated to the first privileged domain and the second privileged domain.

14. The non-transitory computer readable medium of claim 13, wherein the computer readable program code further causes the computer system to:

change the first number of cycles allocated to the first privileged domain and the second privileged domain to a second number of cycles allocated to the first privileged domain and the second privileged domain according to the execution of the first privileged domain and the second privileged domain.

15. The non-transitory computer readable medium of claim 13, wherein the first privileged domain and the second privileged domain are control domains.

* * * * *